Sept. 1, 1931.  W. E. DATE  1,821,091
MOTOR CONTROLLER
Filed April 17, 1929

INVENTOR.
William E. Date
BY
ATTORNEYS.

Patented Sept. 1, 1931

1,821,091

UNITED STATES PATENT OFFICE

WILLIAM E. DATE, OF EAST ORANGE, NEW JERSEY, ASSIGNOR TO CUTLER-HAMMER, INC., OF MILWAUKEE, WISCONSIN, A CORPORATION OF DELAWARE

MOTOR CONTROLLER

Application filed April 17, 1929. Serial No. 355,759.

This invention relates to control of variable speed motors, and is particularly applicable to control of motors driving printing presses or like machinery.

Such machinery requires a heavy torque at the start to overcome the friction of rest, but after starting the torque required is considerably lessened. Also in the case of such machinery it is desirable to regulate the normal operating speed by inserting more or less resistance into the armature circuit. The maximum resistance which is required to operate the armature at the slowest desired operating speed is usually higher than the resistance which will permit sufficient current to flow through the motor armature at the start.

The present invention has among its objects to afford improved control having the operating characteristic aforedescribed.

Another object is to provide a controller which is simple in operation.

Another object is to provide a controller in which the main operating parts can be mounted in a separate convenient locality, away from the press and where starting, stopping and speed adjustment for running can be obtained at the press.

Another object is to provide a controller which requires a minimum of space for the parts which have to be mounted at the press, so as to be located convenient to the operator.

Another object is to provide a controller in which the amount of energy which is dissipated by the speed selector mounted on the press is reduced to a minimum.

Further objects and advantages will be apparent from the appended description and claims.

Figure 1:
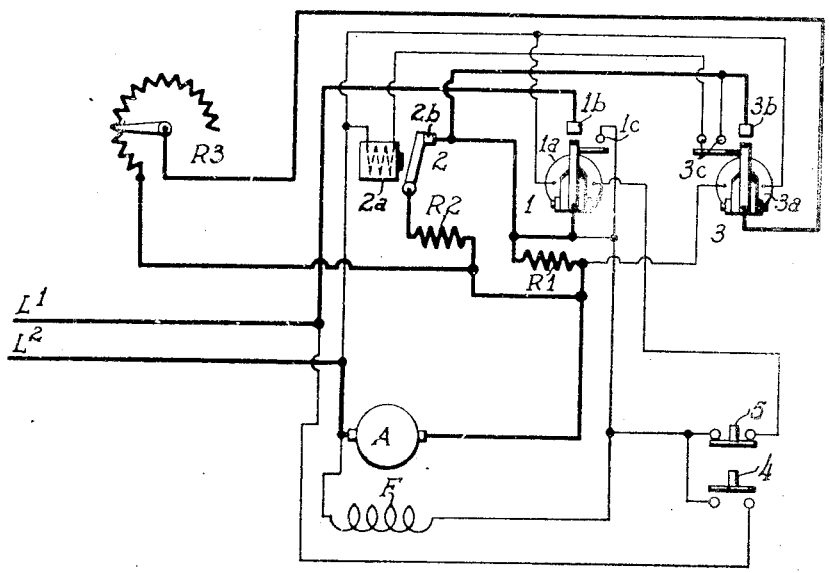
Figure 2:
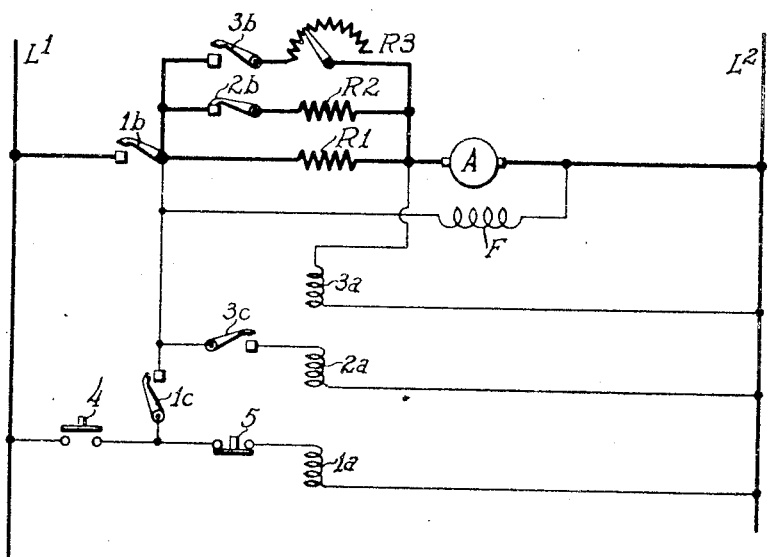

Figure 1 is a diagram of my invention and Fig. 2 is a simplified across the line diagram, showing more in detail the circuits of the apparatus illustrated in Fig. 1.

Referring to the drawings, A is the armature and F the shunt field of a direct current motor driving a printing press and supplied with current from the lines L' and L2. The controller comprises a magnet switch 1, having a magnet winding 1a, a normally open main contact 1b, and a normally open auxiliary contact 1c, a second magnet switch 2, having magnet winding 2a and normally closed contact 2b, and a magnet switch 3, having a magnet winding 3a, a normally open main contact 3b and normally open auxiliary contacts 3c. The controller also includes the resistances R' and R2, the purpose of which will be described hereafter, while a separate regulating resistance R3 is mounted at the printing press in proximity to a push button station comprising the normally open start button 4 and the normally closed stop push button 5. The apparatus functions in the following manner:

If it is desired to start the press, the operator pushes the button 4, thereby closing a circuit from the line L' through start button 4, stop button 5, the magnet winding 1a of switch 1, to line L2. This closes contacts 1b and 1c of switch 1, thereby establishing a circuit from the line L' through the starting resistance R', armature A to line L2. A branch circuit is also established from line L', through contact 1b, through the shunt field F of the motor to line L2, and a second shunt circuit is established from line L', through contact 1b, through normally closed contact 2b, and resistance R2 to the armature A of the motor. The resistance R' is thus paralleled by the resistance R2, so that the starting resistance in series with the motor armature is at a minimum, and the motor will start the press.

When the contacts 1b and 1c close, they complete a circuit in shunt with the push button 4, thereby shortcircuiting this push button, so that the magnet switch 1 will remain energized when the push button 4 is released.

The coil 3a of switch 3 is connected across the armature of the motor. As the armature accelerates its counter-electromotive force increases, thereby increasing the energization of the coil 3a, and when the speed of the motor has reached a certain value, the coil 3a will be sufficiently energized to operate, thereby causing closure of contact 3b, which operates to connect the resistor R3 in parallel with the resistor R'. At the same time the magnet switch 3a also closes the contacts 3c, thereby energizing the magnet 2a which causes opening of the contact 2b so that the resistor R2 is cut out of circuit. The resistor R' is thus paralleled by the resistor R3, and, depending upon the adjustment of the resistor R3, the total value of the resistance in series with the armature of the motor varies. It is thus possible, by varying the resistor R3 from zero to infinity to vary the regulating resistance in series with the armature A from zero to the value of the resistor R', thereby varying the speed of the motor correspondingly.

It will be seen that with this arrangement the heat which has to be dissipated to regulate the speed of the motor is partly dissipated by the resistor R' and partly by the resistor R3. As the resistor R3 is mounted near the press, where it is desirable to reduce the heat developed to a minimum, it will be seen that this arrangement of the controller has great advantages, in that such heat is actually greatly reduced over the amount which would have to be dissipated if a straight series regulating resistor was used in the armature circuit and this resistor was mounted in the place of resistor R3.

This arrangement of resistors also permits reduction of the size of the resistor R3 which is of importance, as the space at the press where it is mounted to be conveniently accessible to the operator, is often limited. It will be further seen, that the resistor R' serves both for the initial starting operation and the speed regulation while the resistor R2 is only in circuit during the initial starting period and is automatically cut out when the motor has accelerated. Thus it is possible to reduce the capacity of the resistor R2 to a minimum, and as a result the total amount of resistance material for the controller is greatly reduced.

While I have described in the foregoing one embodiment of my invention, it will be understood by those skilled in the art, that the invention is capable of many modifications without departing from the scope thereof as specified in the appended claims.

What I claim as new and desire to secure by Letters Patent is:—

1. In a motor controller, the combination with a resistor included in the motor circuit during starting and running, a second resistor, means for establishing a paralleling connection between said resistors during starting and for interrupting such connection during running, a variable resistor, and means for establishing a paralleling connection between said first mentioned resistor and said variable resistor during running.

2. In a motor controller a resistor connected in the motor circuit during starting and running, a second resistor, means for connecting said second resistor in parallel with said first resistor for starting the motor, a variable resistor and means to substitute said third resistor for said second resistor for controlling the motor speed during normal operation.

3. In a motor controller a fixed resistor connected in the motor circuit during starting and running, a second fixed resistor connected in parallel with said first resistor to start the motor, a variable resistor to be connected in parallel with said first resistor to regulate the running speed of said motor, and means to disconnect from circuit said second resistor and to connect into the circuit said third resistor.

4. In combination, a motor, a fixed resistor connected in the motor circuit during starting and running, a second fixed resistor to be connected in parallel with said first resistor to start the motor, a variable resistor for connection in parallel with said first resistor to regulate the running speed of said motor, and means responsive to the speed of the motor to cut out said second resistor and cut in said third resistor.

5. In an automatic controller for starting a motor and operating it at a given speed, a resistor permanently connected to the motor circuit, a second and a third resistor, automatic means to connect said second resistor in parallel with said first resistor during starting and to disconnect said second resistor and connect said third resistor during running, said means being adapted to respond to the speed of the motor.

6. In combination, a motor, a resistor permanently connected to the motor circuit, a second resistor adapted to start the motor when connected in parallel with said first resistor, a third resistor adapted to regulate the running speed of the motor when connected in parallel with said first resistor and automatic means, responsive to the speed of the motor for controlling the connection of said resistors.

7. In combination, a motor, a resistor permanently connected to the motor circuit, a second resistor adapted to start the motor when connected in parallel with said first resistor, a third resistor adapted to regulate the running speed of the motor when connected in parallel with said first resistor and automatic means, responsive to the speed of the motor for controlling the connection of said resistors and manual means to control the operation of said automatic means.

In witness whereof, I have hereunto subscribed my name.

WILLIAM E. DATE.